(12) United States Patent
Teece et al.

(10) Patent No.: US 11,710,951 B2
(45) Date of Patent: *Jul. 25, 2023

(54) WIRE TRAY AND MOUNTING INSERT ASSEMBLIES

(71) Applicant: HellermannTyton Corporation, Milwaukee, WI (US)

(72) Inventors: James S. Teece, Cedarburg, WI (US); Scott J. Adams, Menomonee Falls, WI (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,047

(22) Filed: May 4, 2022

(65) Prior Publication Data

US 2022/0263299 A1 Aug. 18, 2022

Related U.S. Application Data

(63) Continuation of application No. 17/210,776, filed on Mar. 24, 2021, now Pat. No. 11,451,025.

(60) Provisional application No. 63/129,397, filed on Dec. 22, 2020.

(51) Int. Cl.
*H02G 3/04* (2006.01)
*H02G 3/32* (2006.01)

(52) U.S. Cl.
CPC ......... *H02G 3/0437* (2013.01); *H02G 3/0456* (2013.01); *H02G 3/32* (2013.01)

(58) Field of Classification Search
CPC ............ B60R 16/0222; B60R 16/0215; B60R 16/0207; B60R 2011/0059; H02G 3/26; H02G 3/22; F16B 37/0842
See application file for complete search history.

(56) References Cited

U.S. PATENT DOCUMENTS

| 3,632,071 A | 1/1972 | Cameron et al. |
| 3,678,798 A * | 7/1972 | Van Niel ............... F16B 37/043 411/43 |

(Continued)

FOREIGN PATENT DOCUMENTS

| DE | 20319556 | 3/2004 |
| DE | 202015003578 | 5/2016 |

(Continued)

OTHER PUBLICATIONS

"Extended European Search Report", EP Application No. 21211285.8, dated May 16, 2022, 10 pages.

(Continued)

*Primary Examiner* — Krystal Robinson
(74) *Attorney, Agent, or Firm* — Colby Nipper PLLC

(57) ABSTRACT

This publication describes techniques and apparatuses for releasably attaching an object (e.g., a wire tray) to a substrate. Current apparatuses generally do not enable the removal of an attached wire tray from a substrate without first removing an insert from a mounting stud extending from the substrate. The disclosed techniques and apparatuses are configured to permit the removal of an attached wire tray from a substrate without first removing an insert from a mounting stud extending from the substrate.

20 Claims, 10 Drawing Sheets

(56) References Cited

U.S. PATENT DOCUMENTS

| | | | |
|---|---|---|---|
| 4,934,889 A * | 6/1990 | Kurosaki | F16B 37/0842 411/908 |
| 5,112,475 A | 5/1992 | Henry | |
| 5,173,025 A | 12/1992 | Asami | |
| 5,533,237 A * | 7/1996 | Higgins | F16B 21/075 24/297 |
| 5,536,125 A | 7/1996 | Gaw | |
| 5,760,338 A * | 6/1998 | Suzuki | H02G 3/26 174/72 A |
| 5,816,762 A * | 10/1998 | Miura | F16B 37/0842 411/908 |
| 5,871,182 A | 2/1999 | Johnson et al. | |
| D413,508 S * | 9/1999 | Shibao | D8/382 |
| 6,474,616 B2 | 11/2002 | Yamada et al. | |
| 6,498,296 B2 | 12/2002 | Benito-Navazo | |
| 6,553,615 B1 * | 4/2003 | Hansen | F16B 5/0241 174/152 G |
| 7,082,650 B2 * | 8/2006 | Awakura | F16B 5/0642 24/458 |
| 7,374,200 B2 | 5/2008 | Ikeda et al. | |
| 7,546,987 B2 | 6/2009 | Sinkoff | |
| 8,579,570 B2 | 11/2013 | Fellows et al. | |
| 8,613,414 B2 | 12/2013 | Rosemann et al. | |
| 8,636,454 B2 | 1/2014 | Okada et al. | |
| 9,033,632 B2 | 5/2015 | Komsitsky et al. | |
| 9,347,474 B2 | 5/2016 | Mizukoshi et al. | |
| 9,366,311 B2 * | 6/2016 | Gustavsson | F16F 7/108 |
| 9,533,718 B2 | 1/2017 | Smith et al. | |
| 9,599,140 B2 * | 3/2017 | Diep | F16B 37/043 |
| 9,649,993 B1 | 5/2017 | Dickinson et al. | |
| 9,841,123 B1 | 12/2017 | White | |
| 10,060,463 B2 | 8/2018 | Dendo | |
| 10,196,013 B2 | 2/2019 | Pantino et al. | |
| 10,399,516 B2 | 9/2019 | Chapman | |
| 10,408,248 B1 | 9/2019 | Safry et al. | |
| 10,737,642 B2 * | 8/2020 | Takahashi | B60R 16/0215 |
| 10,900,514 B2 | 1/2021 | Teece et al. | |
| 11,015,742 B2 * | 5/2021 | Locatelli | H02G 3/32 |
| 11,451,025 B2 | 9/2022 | Teece et al. | |
| 11,519,444 B2 | 12/2022 | Teece et al. | |
| 2004/0094952 A1 | 5/2004 | Twardawski | F16L 37/008 285/210 |
| 2004/0238203 A1 * | 12/2004 | Arai | B60R 16/0215 174/135 |
| 2006/0054342 A1 | 3/2006 | Nakamura et al. | |
| 2007/0272807 A1 * | 11/2007 | Takagaki | B60R 16/0215 248/71 |
| 2008/0134477 A1 | 6/2008 | Hart et al. | |
| 2009/0189025 A1 | 7/2009 | Lindquist et al. | |
| 2010/0026028 A1 | 2/2010 | Smith et al. | |
| 2010/0127135 A1 | 5/2010 | Stocker | |
| 2010/0183270 A1 | 7/2010 | Davis et al. | |
| 2010/0258686 A1 | 10/2010 | Sutton et al. | |
| 2013/0039718 A1 * | 2/2013 | Fellows | F16B 37/0842 411/112 |
| 2016/0020000 A1 * | 1/2016 | Doushita | H02G 3/32 174/72 A |
| 2016/0101756 A1 | 4/2016 | Benedetti | |
| 2018/0050646 A1 | 2/2018 | Chapman | |
| 2019/0081464 A1 | 3/2019 | Valenti et al. | |
| 2019/0136895 A1 * | 5/2019 | Teece | B60R 16/0215 |
| 2019/0304870 A1 | 10/2019 | Boyd et al. | |
| 2020/0032829 A1 | 1/2020 | Lee | |
| 2020/0056726 A1 | 2/2020 | Loss et al. | |
| 2020/0232499 A1 * | 7/2020 | Rasmus | F16B 37/043 |
| 2021/0102569 A1 | 4/2021 | Teece et al. | |
| 2022/0200252 A1 | 6/2022 | Teece et al. | |

FOREIGN PATENT DOCUMENTS

| | | |
|---|---|---|
| EP | 1849687 | 10/2007 |
| GB | 2367955 | 4/2002 |
| WO | 2009111620 | 9/2009 |
| WO | 2014027080 | 2/2014 |
| WO | 2016031774 | 3/2016 |

OTHER PUBLICATIONS

"Non-Final Office Action", U.S. Appl. No. 17/123,034, dated Jun. 8, 2022, 8 pages.

"Notice of Allowance", U.S. Appl. No. 17/123,034, dated Aug. 5, 2022, 9 pages.

"European Search Report", EP Application No. 18204958.5, dated Mar. 22, 2019, 2 pages.

"Extended European Search Report", EP Application No. 21156638.5, dated Jun. 21, 2021, 9 pages.

"Foreign Office Action", EP Application No. 18204958.5, dated Apr. 9, 2020, 6 pages.

"Foreign Office Action", EP Application No. 18204958.5, dated Dec. 3, 2019, 5 pages.

"Non-Final Office Action", U.S. Appl. No. 16/180,732, dated Apr. 1, 2020, 9 pages.

"Notice of Allowance", U.S. Appl. No. 17/210,776, dated Mar. 4, 2022, 9 pages.

"Notice of Allowance", U.S. Appl. No. 16/180,732, dated Sep. 21, 2020, 7 pages.

"Restriction Requirement", U.S. Appl. No. 16/180,732, dated Jan. 10, 2020, 8 pages.

"Restriction Requirement", U.S. Appl. No. 17/123,034, dated Mar. 9, 2022, 6 pages.

"Foreign Office Action", EP Application No. 21156638.5, dated Oct. 13, 2022, 7 pages.

* cited by examiner

WIRE TRAY AND MOUNTING INSERT ASSEMBLIES

INCORPORATION BY REFERENCE

This application is a continuation application of U.S. application Ser. No. 17/210,776, filed Mar. 24, 2021, which is a non-provisional of U.S. application Ser. No. 63/129,397, filed Dec. 22, 2020, the disclosures of which are incorporated herein by reference.

BACKGROUND

A wire tray, also referred to as a channel, wire management tray, or a cable tray, is a receptacle utilized for routing objects (e.g., cables, wires, a wiring harness) on a substrate. In use, a wire tray mounts to the substrate. In one example, a threaded mounting stud extends from a substrate of a vehicle; a thread-engaging mounting insert may be inserted through a top surface of a wire tray and into an aperture defined through the wire tray. An operator may screw the insert onto the stud to mount the wire tray to the substrate. To remove the wire tray from the substrate, a reverse process can be performed, where the insert is unscrewed from the stud before the insert can be removed from the wire tray.

SUMMARY

This document describes techniques and apparatuses for releasably attaching an object to a substrate. In aspects, the techniques and apparatuses include one or more of wire trays, mounting inserts, or assemblies thereof, and enable the removal of an attached wire tray from a mounted substrate without first removing a mounting insert from a mounting stud extending from the substrate.

In aspects, disclosed is a system that includes a wire tray and a first insert. The wire tray includes a mount. The mount includes a top surface opposite a bottom surface, an aperture, and a connecting ledge extending from the top surface of the mount. The aperture extends from the top surface to the bottom surface and defines a sidewall. The first insert is configured to be releasably retained by the mount. The first insert includes a body and a cantilevered lug. The body has an upper end configured for insertion into the aperture through the bottom surface and a lower end spaced apart from the upper end. A cavity extends into the body, and includes a threaded receiver configured to releasably engage threads of a mounting stud. The cantilever lug is configured for snap-fit connection with the connecting ledge. The cantilever lug comprising includes a beam, a catch, and a stop. The beam has a root end connecting to the body and extending upwards therefrom and an insertion end configured for insertion through the aperture. The catch extends downwardly from the insertion end of the beam and is configured to engage the connecting ledge. The stop is configured for limiting the insertion of the body through the aperture. The stop extends from the body between the upper end and the lower end and is positioned intermediate the catch and the lower end. The first insert is configured for insertion into the aperture through the bottom surface of the mount, with the stop bearing against the bottom surface of the mount. The first insert is configured to receive the mounting stud therethrough, the mounting stud extending through the aperture into the first insert, the threads of the mounting stud engaging the threaded receiver.

In other aspects, disclosed is an apparatus including a body, a cantilever lug, and a stop. The body includes an upper end, a lower end opposite the upper end, and a cavity that extends into the body. The cavity includes a threaded receiver configured to releasably engage threads of a mounting stud. The cantilever lug is configured for snap-fit connection with a connecting ledge of the mount. The cantilever lug includes a beam and a catch. The beam includes a root end connecting to the body and extending upwards therefrom, and an insertion end configured for insertion through an aperture of a mount. The insertion end extends past the upper end of the body. The catch extends downwardly from the insertion end of the beam and is configured for engaging the connecting ledge. The stop is configured for limiting the insertion of the body through the aperture and extends from the body between the upper end and the lower end. The stop is positioned intermediate the catch and the lower end. The apparatus is configured for insertion into the aperture through a bottom surface defined in a mount with an upper side of the stop bearing against the bottom surface of the mount. The apparatus is further configured for receiving the mounting stud therethrough, with the mounting stud extending through the aperture into the apparatus, and with the threads of the mounting stud engaging the threaded receiver.

This Summary is provided to introduce simplified concepts of techniques and apparatuses for releasably attaching an object to a substrate, which are further described below in the Detailed Description and are illustrated in the Drawings. This Summary is not intended to identify essential features of the claimed subject matter, nor is it intended for use in determining the scope of the claimed subject matter.

BRIEF DESCRIPTION OF THE DRAWINGS

The details of one or more aspects of techniques and apparatuses for releasably attaching an object to a substrate are described in this document with reference to the following drawings.

The use of same numbers in different instances may indicate similar features or components.

DETAILED DESCRIPTION

This document describes techniques and apparatuses for releasably attaching an object to a substrate. In aspects, the techniques and apparatuses may include one or more of wire trays, mounting inserts ("inserts"), or assemblies thereof. Aspects of the present disclosure address technical problems associated with the attachment and removal of a wire tray to a substrate.

In one example, a threaded mounting stud extends from a substrate (e.g., a substrate of a vehicle, such as a sill plate) and a thread-engaging mounting insert is inserted through a bottom surface of a wire tray and into an aperture defined through the wire tray at a mount. An assembly (system) may be formed by the actuation of a snap-fit connection between the insert and the mount. The insert may then be pressed onto the stud to removably attach the assembly to the substrate. To remove the wire tray from the substrate, the snap-fit connection between the insert and the mount may be unactuated, enabling the wire tray and mount to be removed from the substrate to which the insert is mounted without first unscrewing the insert from the stud. This is but one example of how the described techniques and apparatuses may be used to address technical problems associated with the attachment and removal of a wire tray to a substrate. Other examples and implementations are described throughout this document.

Figure 1:
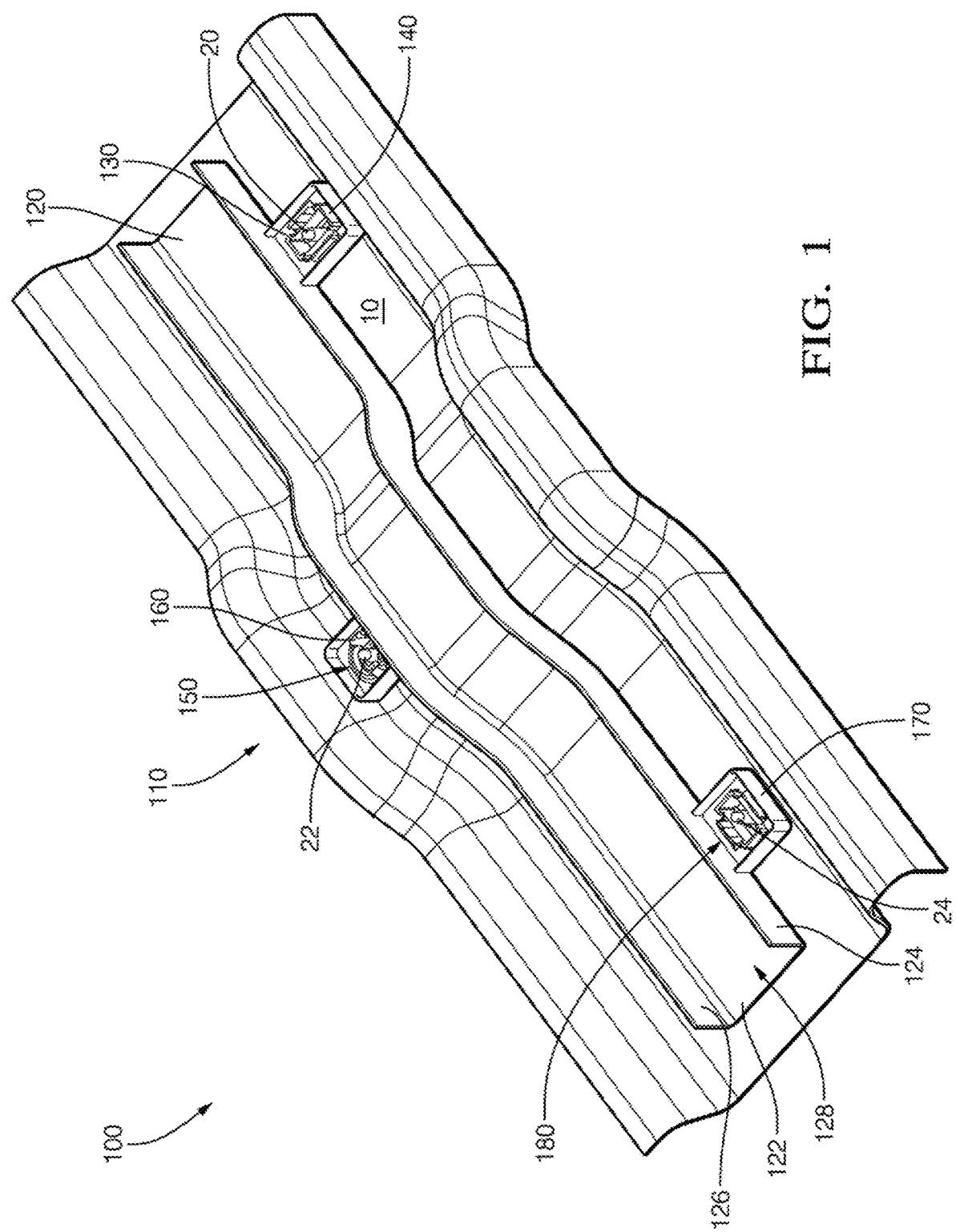
FIG. 1 is a first side, perspective, environmental view that includes a wire tray assembly, in accordance with the techniques and apparatuses of this disclosure.

FIG. 1 is a first side, perspective, environmental view that illustrates an example environment 100 in which techniques and apparatuses for releasably attaching an object, such as a wire tray, to a substrate can be implemented. The environment 100 includes a substrate 10 (e.g., surface of an object, panel of a vehicle) onto which a wire tray assembly 110 may be mounted.

The substrate 10 may include one or more connectors (e.g., flanges, ridges, fasteners, screws, pins, bolts, and the like) to which a wire tray 120, having a mount, may be mounted utilizing an insert. The connectors may include a threaded bolt, for example, one or more mounting studs (e.g., stud 20, stud 22, stud 24) that extend from the substrate 10. A stud may be formed of any material, such as a steel alloy, and in the example illustrated in FIGS. 2A and 6A, stud 20 and stud 22 include helical threads (e.g., threads 30, threads 32) formed into an outer surface.

The wire tray assembly 110 illustrated in FIG. 1 includes a wire tray 120, at least one mount (e.g., first mount 130, second mount 160, third mount 180), and at least one mounting insert (e.g., first insert 140, second insert 150, third insert 170). The wire tray 120 is preferably formed of a polymeric dielectric material, such as a polypropylene, which may be molded to fit a contour of the substrate 10. The mounts and/or mounting inserts may be formed of a different material than is utilized for the wire tray 120. The mounting inserts may be formed of any material, including, but not limited to, polyamide polymers (e.g., NYLON) that have a greater strength and wear resistance than the material utilized for the wire tray 120.

The wire tray 120 is configured for routing at least one object, for example, a wiring harness of a vehicle. The wire tray 120 includes a base 122. The base 122 defines a channel configured to receive the objects for routing thereon. The wire tray 120 may include one or more channel walls (e.g., first channel wall 124, a second channel wall 126) that, together with the base 122, define the channel (e.g., channel 128). A mounting insert (e.g., first insert 140) may be utilized to releasably connect the wire tray 120 to the substrate 10 via the connector (e.g., stud 20), for example, with the first insert releasably retained by the mount.

The wire tray 120 illustrated in FIG. 1 includes multiple mounts, namely, a first mount 130, a second mount 160, and a third mount 180. The wire tray 120 of FIG. 1 is illustrated with the first mount 130 and the third mount 180 located outside the first channel wall 124, the second mount 160 located outside the second channel wall 126, and all three of the mounts located outside of the channel 128. In other aspects, one or more of the mounts can be located inside the channel, or outside the channel, one or more of the mounts can be located outside a sidewall, and/or one or more of the mounts may be located inside the sidewall. In a first example, all mounts are located on the same side of the wire tray (e.g., all on a first side, all on a second side). In a second example, at least one of the mounts is located on a first side of the wire tray, and at least one of the mounts is located on a second side of the wire tray. In a third example, one or more of the mounts are located in the channel of the wire tray.

In aspects, an insert may have a generally cylindrical shape, a generally rectilinear shape, or another shape. In the wire tray assembly 110 of FIG. 1, the first insert 140 and the third insert 170 have a generally rectilinear shape extending beyond a stop and aligned with a longitudinal axis of the first stud 20, whereas the second insert 150 has a generally cylindrical shape extending beyond a stop and aligned with a longitudinal axis of the second stud 22. One or more of the inserts may be oriented differently from one or more of the other inserts. For example, both the first insert 140 and the third insert 170 illustrated in FIG. 1 have generally rectilinear shapes, but the inserts are rotated 90 degrees relative to one another.

Figure 2A:
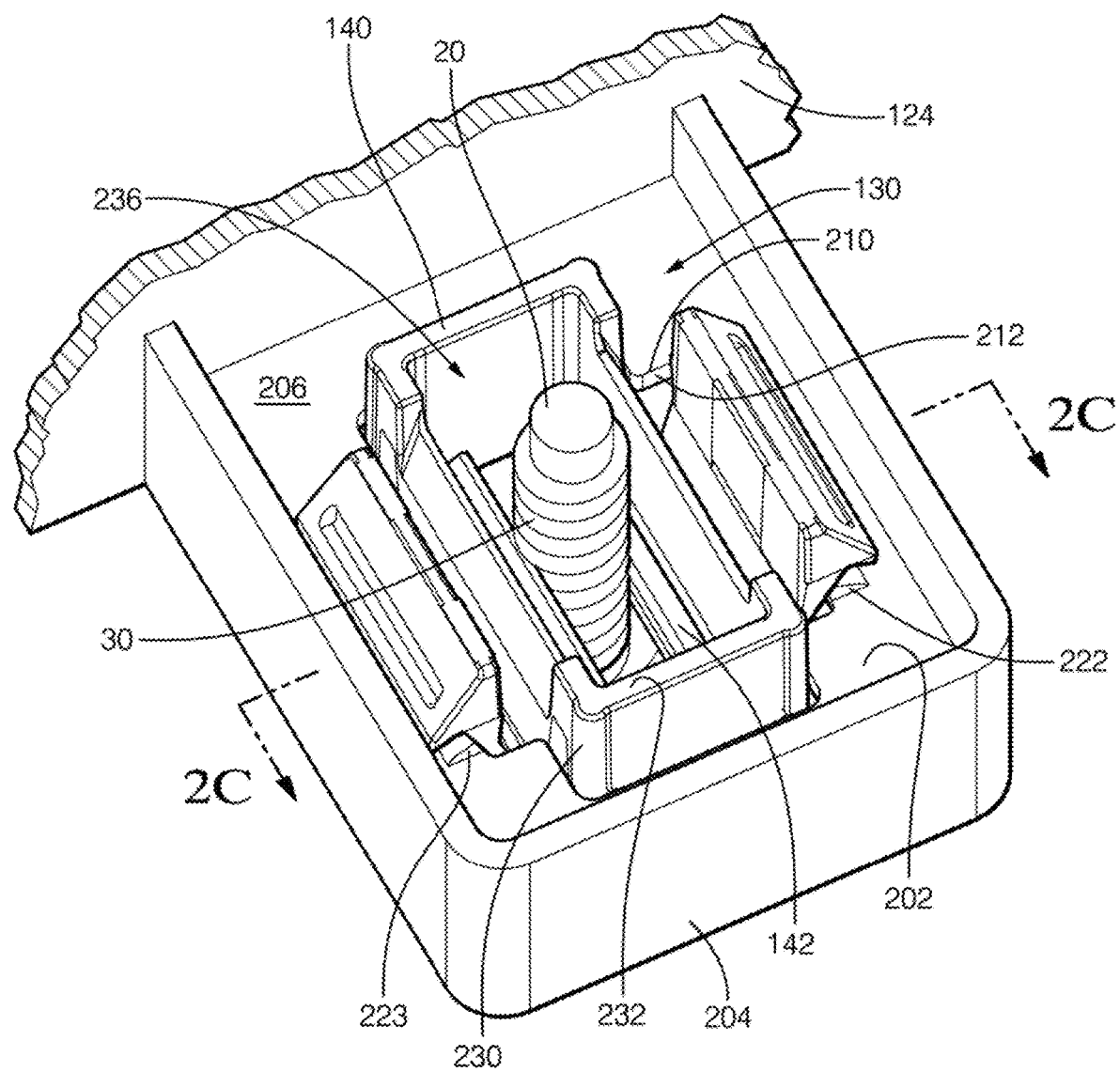
FIG. 2A is a partial, top perspective view of the wire tray assembly of FIG. 1, including a first mount and a first insert.
Figure 2B:
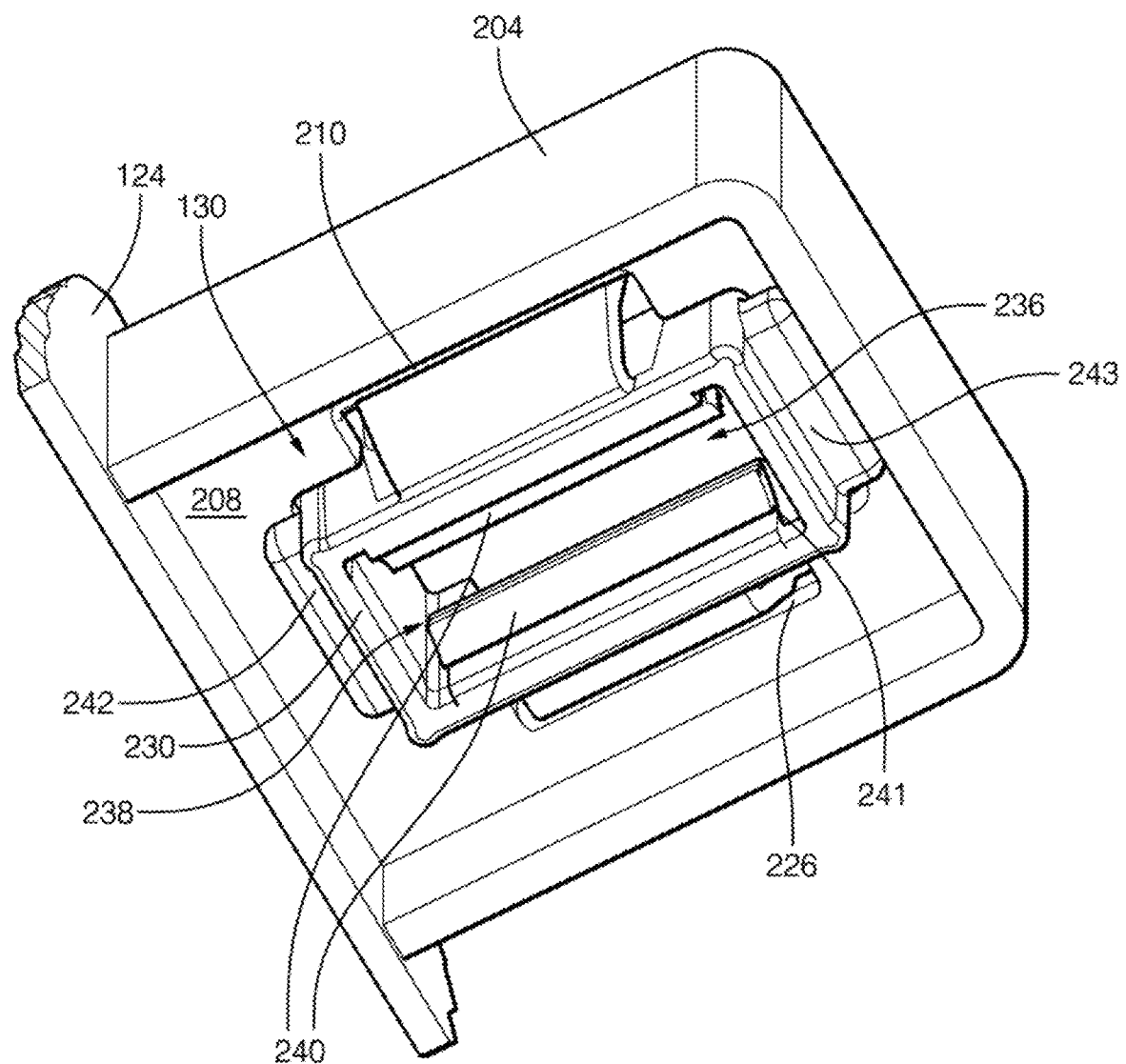
FIG. 2B is a partial, bottom perspective view of the first mount and first insert of FIG. 2A.
Figure 2C:
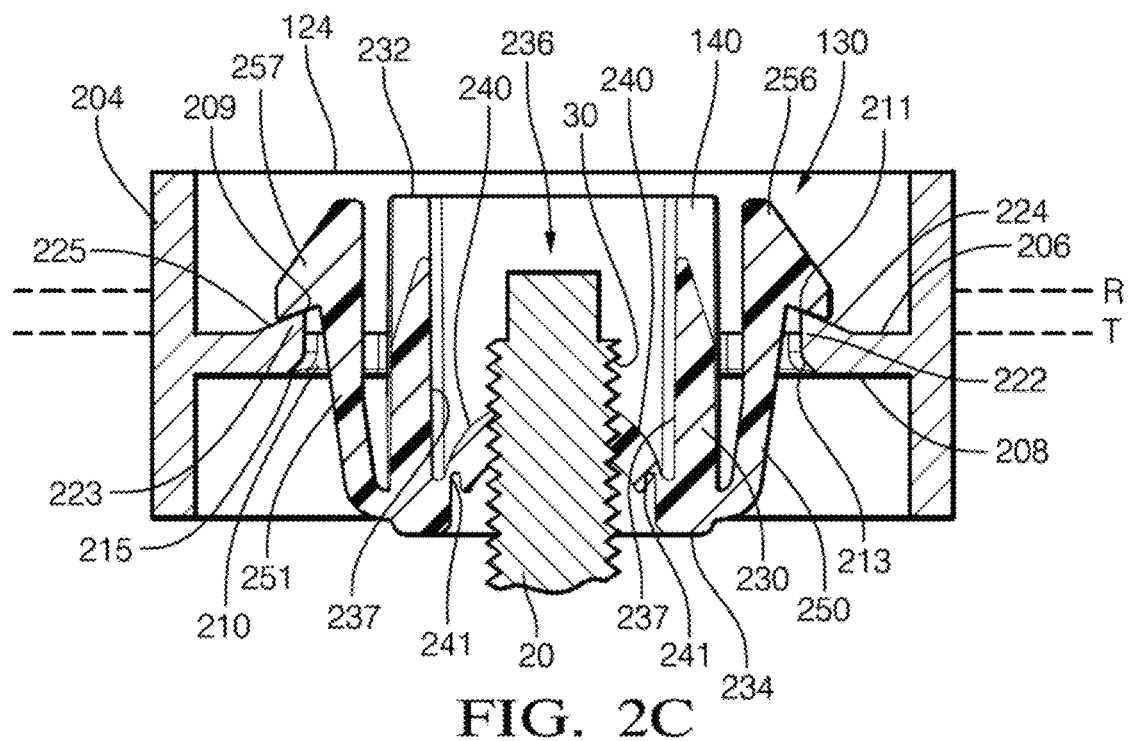
FIG. 2C a cross-sectional view of the first mount and first insert of FIG. 2A.

The wire tray assembly 110 illustrated in FIG. 1 includes a first mount 130 and a first insert 140, as further illustrated in FIGS. 2A through 2C, FIG. 3, and FIGS. 4A through 4C. The first insert 140 is configured for mounting the first mount 130 to a substrate 10 at a stud 20 that extends from the substrate 10, as illustrated in FIGS. 2A-2C. The first mount 130 may include a base 202 that extends from the wire tray 120 (e.g., from first channel wall 124). The base 202 may be defined in a plane generally parallel to a plane of the base 122. The base 202 includes a top surface 206 opposite a bottom surface 208, with an aperture 210 defined therebetween.

The first insert 140 is configured to connect to the first mount 130, for example, through a snap-fit connection. Through such a connection, the aperture 210 receives at least one insertion end (e.g., insertion end 256, insertion end 257) of a cantilever lug (e.g., cantilever lug 250, cantilever lug 251) of the first insert 140 therethrough. The aperture 210 may include a ramp (e.g., ramp 213, ramp 215) configured to guide the insertion end into the aperture 210, which may facilitate a more-accurate, secure snap-fit connection.

Figure 3:
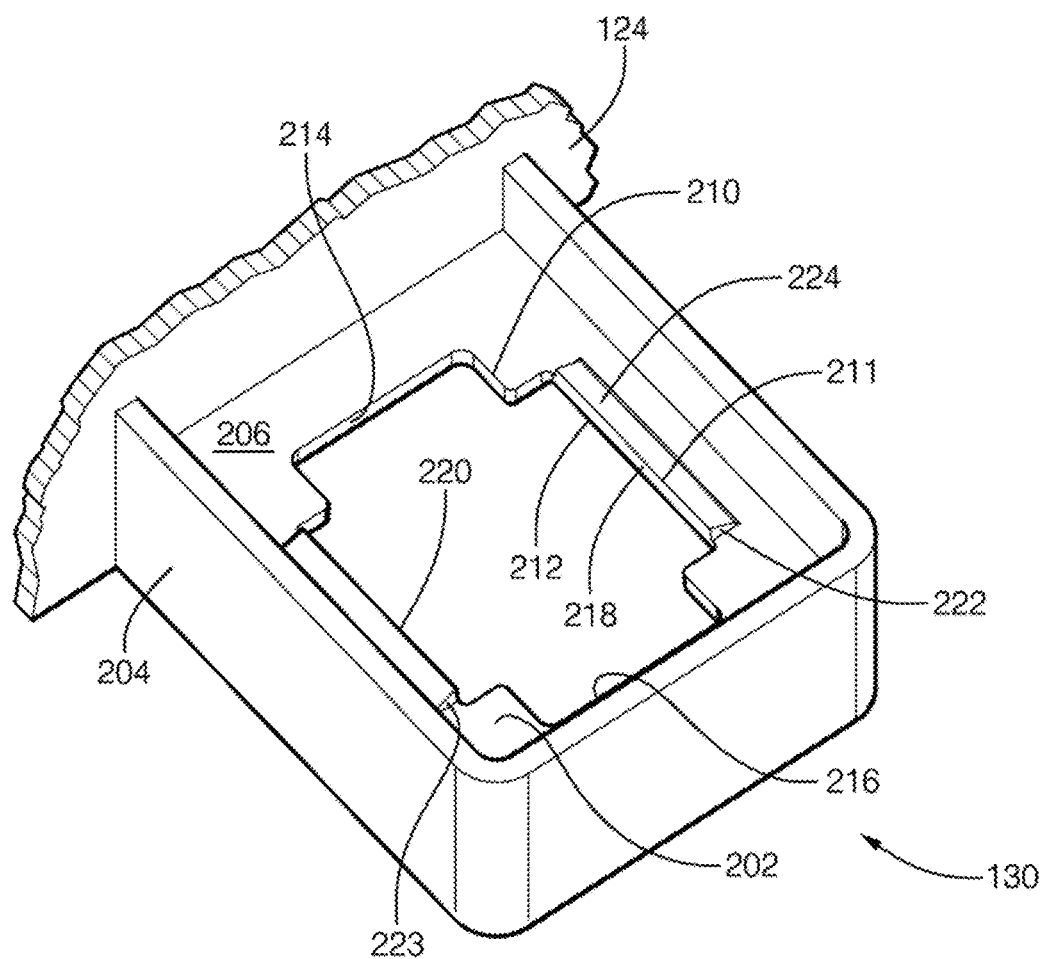
FIG. 3 is a perspective view of the first mount of FIG. 2A.
Figure 4A:
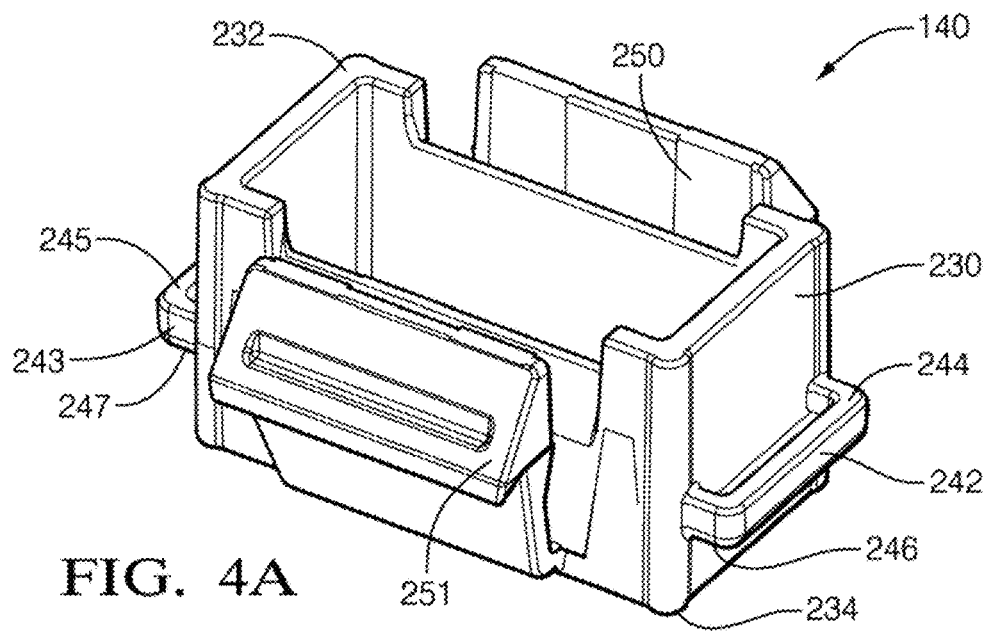
FIG. 4A is a top perspective view of the first insert of FIG. 2A.
Figure 4B:
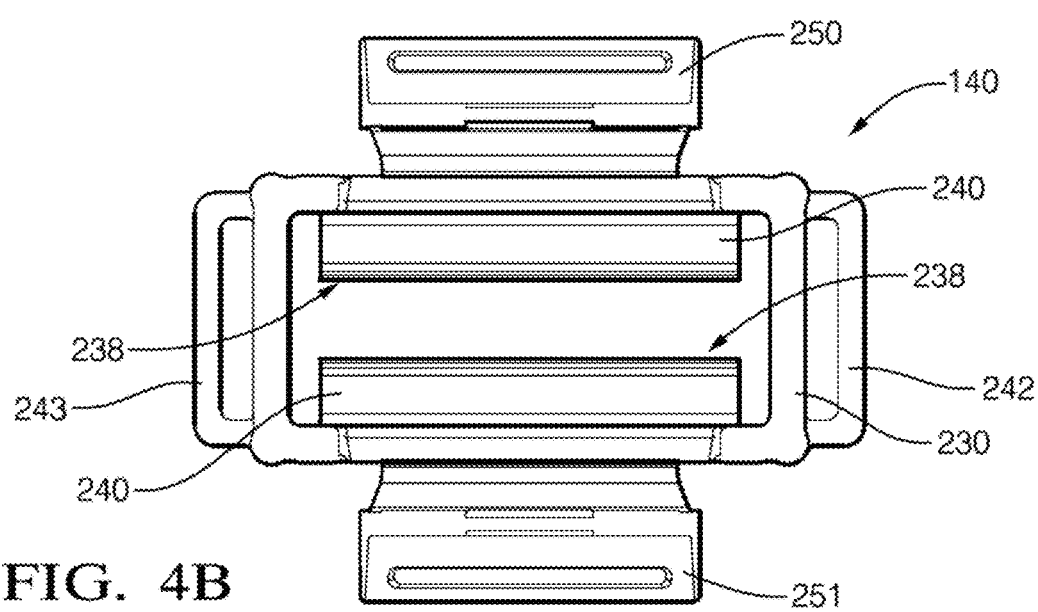
FIG. 4B is a plan view of the first insert of FIG. 2A.
Figure 4C:
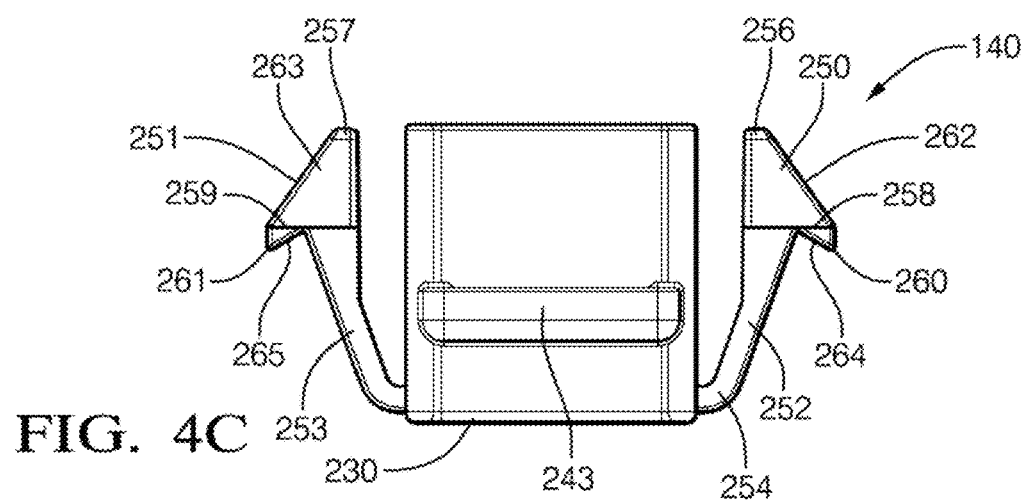
FIG. 4C is a left side view of the first insert of FIG. 2A.

The aperture 210, further illustrated in FIG. 3, includes at least one sidewall 212. The sidewall 212 may extend between the top surface 206 and the bottom surface 208. The aperture 210 illustrated in FIG. 3 is cross-shaped, including ends (first end 214, second end 216) shaped to receive a rectilinear-shaped first insert 140 therein, and including spaced-apart sides (first side 218, second side 220). In other aspects, the shape of the aperture 210 may differ.

The first insert 140 includes a body 230 having an upper end 232 configured for insertion into the aperture 210 of the first mount 130 and a lower end 234 opposite the upper end 232. In the aspect illustrated in FIGS. 2A-2C, a cavity 236 is defined in the body 230. The cavity 236 may extend into at least a portion of the body 230. The cavity 236 may include at least one thread-engaging receiver 238 (threaded receiver 238) configured to releasably engage the threads (e.g., threads 30) of a mounting stud (e.g., stud 20) extending from the substrate 10. The body 230 may be configured to accept a tool to rotate the first insert 140 about a longitudinal axis of the first stud 20. In the example illustrated in FIG. 2A, a flat-blade screwdriver, or similar tool, may be inserted into the cavity 236 to either tighten or loosen the first insert 140 on the stud 20.

The threaded receiver 238 may include at least one pawl 240 configured to releasably engage the threads of the mounting stud. As illustrated in FIG. 2C, a pair of pawls 240 attach to an inner surface 237 of the cavity 236 by webs 241 that define pivot points. The pivot points enable the pawls 240 to outwardly deflect when engaging the threads of the stud during installation. The webs 241 provide a spring-force such that the pawls 240 form a ratchet mechanism with the threads of the stud, thereby enabling the installation over the stud with the installation force. The threaded receiver 238 can be disengaged from the threads of the mounting stud to remove the insert from the stud. For example, the cavity 236 may be configured to receive a tool, such as a blade of a screwdriver or the tips of pliers, and the tool may be utilized by an operator to disengage one or more of the pawls 240 from the stud, thereby enabling the removal of the insert from the stud. The cavity 236 may further be configured to receive the fingertips of an operator, which can be used to disengage one or more of the pawls 240 from the stud, thereby enabling the removal of the insert from the stud. The insert (e.g., first insert 140) may be rotatable about a longitudinal axis of the mounting stud. That is, the first insert 140 may be threaded on and off the stud 20 similar to a nut and bolt combination.

The first insert 140 may include at least one resilient cantilever lug (e.g., cantilever lug 250, cantilever lug 251) configured for flexible insertion through the aperture 210 and for snap-fit connection with at least one connecting ledge (e.g., connecting ledge 222, connecting ledge 223) of the mount, for example, a connecting ledge on a top surface 206 of the first mount 130. In aspects, a resilient cantilever lug is configured to flex to permit a portion of the cantilever lug to be inserted through the aperture and couple to the connecting ledge in an engaged mode, and to decouple from the connecting ledge and flex to permit the portion of the cantilever lug to be withdrawn from the aperture in a disengaged mode. The connecting ledge may be defined in and/or extend from the top surface of the mount. The aspect illustrated in FIG. 2C and FIG. 3 includes a first cantilever lug 250 configured for snap-fit connection with a first connecting ledge 222 and a second cantilever lug 251 configured for snap-fit connection with a second connecting ledge 223.

The insert (e.g., first insert 140) is configured to be pushed in through the bottom surface 208 of the wire tray 120 to removably attach the wire tray 120 to the substrate 10. Through use of the snap-fit connection, the catch of the cantilever lug can be disengaged from the connecting ledge, permitting the wire tray 120 to be removed from the substrate 10, while the first insert 140 remains attached to the stud 20.

The connecting ledge (e.g., connecting ledge 222, connecting ledge 223) may include at least one chamfer (e.g., chamfer 224, chamfer 225). The chamfer may be at any angle from horizontal. In aspects, the angle of the chamfer is 19 to 29 degrees from horizontal. In other aspects, the angle of the chamfer is 24 degrees from horizontal, or the angle of the chamfer is at least greater than zero, but less than ninety degrees from horizontal. The chamfer further includes an undercut face (e.g., undercut face 226, undercut face 227). The undercut face is configured to engage a retention face (e.g., retention face 264 of catch 258, retention face 265 of catch 259) when the snap-fit connection is actuated. In the aspect illustrated in FIG. 2C, connecting ledge 222 includes a rim 211 and chamfer 224 extends from the rim 211 to the top surface 206. Further, connecting ledge 223 includes a rim 209 and chamfer 225 extends from the rim 209 to the top surface 206. The chamfer may extend, at a first end, upwards away from the top surface 206 of the base 202 and, at a second end, extend from the aperture 210, as illustrated in FIG. 2C. In other aspects, the chamfer may be spaced apart from the aperture 210. The undercut face may be positioned at an arcuate angle to the aperture 210.

Referring now to FIG. 2C, the top surface 206 defines a top surface plane (T), and a rim plane (R) is defined between rim 209 and rim 211. The rim plane (R) may be generally parallel to the top surface plane (T) and vertically spaced from the top surface plane (T).

The cantilever lug may include a beam (e.g., beam 252, beam 253) and a catch (e.g., catch 258, catch 259). The beam may include a root end (e.g., root end 254, root end 255) connecting to the body 230 and extending upwards therefrom to an insertion end (e.g., insertion end 256, insertion end 257). The root end may connect to the body 230 at the lower end 234 of the body 230. The insertion end may be configured for insertion through the aperture 210. The catch extends downwardly from the insertion end of the beam and is configured for engaging a connecting ledge of the base 202 to form the snap-fit connection.

The catch includes a tip (e.g., tip 260, tip 261) located between an insertion face (e.g., insertion face 262, insertion face 263) and a retention face (e.g., retention face 264, retention face 265). The insertion face is configured for contacting the sidewall and for inward deflection during actuation and de-actuation of the snap-fit connection. The retention face is configured to engage the connecting ledge on the top surface 206 of the base 202. In aspects, the retention face is at an arcuate angle to the insertion face. The retention face angle may be any angle from horizontal. In aspects, the retention face angle is 28 to 37 degrees from horizontal. In other aspects, the retention face angle is 32 degrees from horizontal. In yet other aspects, the retention face angle is at least greater than zero, but less than ninety degrees from horizontal.

The first insert 140 may further include at least one stop (e.g., stop 242, stop 243). The stop extends from the body 230 between the upper end 232 and the lower end 234. The stop is configured to limit the insertion of the body 230 through the aperture 210. The stop is positioned intermediate the catch and the lower end 234. The stop includes an upper side (e.g., upper side 244, upper side 245) configured for contacting and bearing against the bottom surface 208 of the first mount 130 and a lower side (e.g., lower side 246, lower side 247) spaced apart from the upper side. When inserted to the limit, the stop is positioned adjacently to the bottom surface 208 of mount 130, and the catch of the cantilever lug is positioned adjacently to a top surface 206 of the mount 130, releasably holding the first insert 140 onto the first mount 130 between the stop and the catch. The contact between the upper side of the stop and the bottom surface 208 transfers a retention force from the stud 20 to the first mount 130 when the wire tray assembly 110 is installed on the substrate 10.

In the aspect illustrated in FIGS. 2A-2C and FIGS. 4A-5C, the body 230 has a generally rectilinear shape between the upper end 232 and the stop, and the upper end 232 of the body 230 is configured for receipt into the cross-shaped aperture 210. In other aspects, the body may have a cross-shape, a generally cylindrical shape, a generally rectilinear shape, or another shape between the upper end and the stop.

In aspects, such as illustrated in FIG. 2C and FIG. 3, the top surface 206 of the first mount 130 includes the connecting ledge (e.g., connecting ledge 222, connecting ledge 223). The connecting ledge is configured for snap-fit connection with a cantilever lug of the first insert 140. In aspects, the connecting ledge is positioned above the plane of the top surface 206. When the snap-fit connection is actuated, the catch of the cantilever lug engages the connecting ledge, the stop (e.g., stop 242, stop 243) is brought into contact with the bottom surface 208 of the base 202 (as illustrated in FIG. 2B), and the wire tray 120 is connected to the first insert 140 at the first mount 130, as illustrated in FIG. 2C.

Figure 5A:
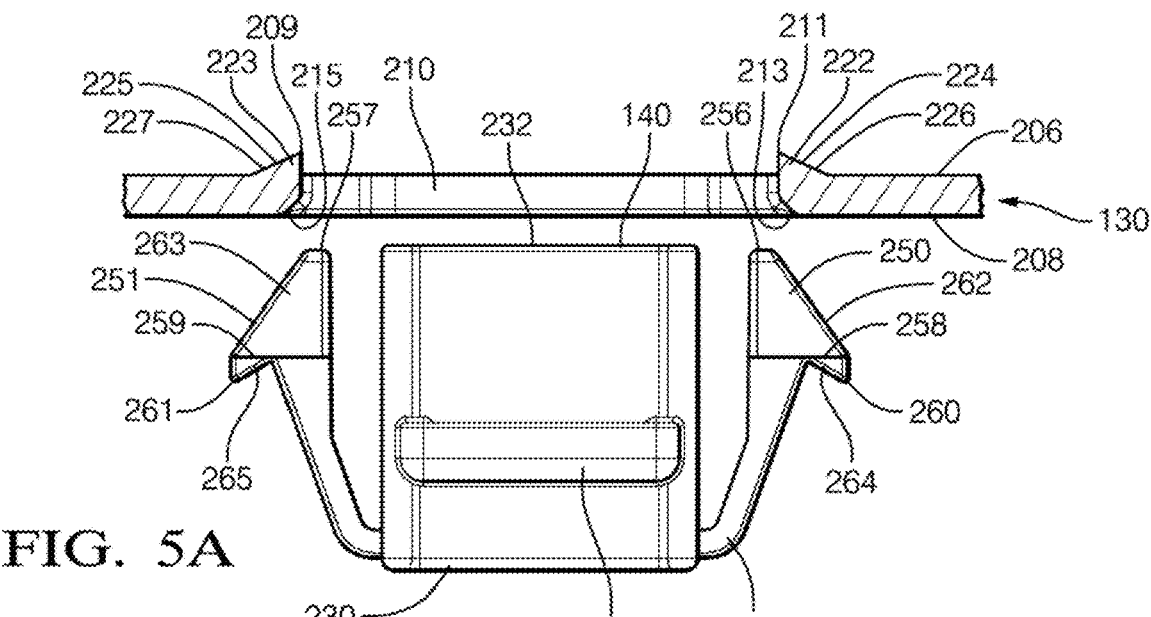
FIG. 5A is a first sequential left side view of the first mount and first insert of FIG. 2A.
Figure 5B:
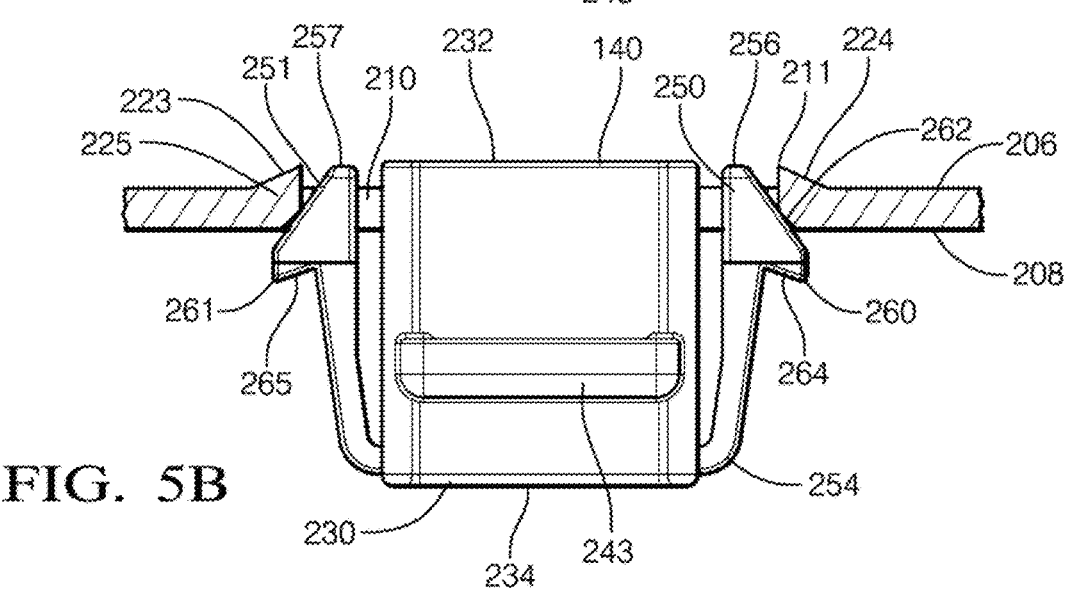
FIG. 5B is a second sequential left side view of the first mount and first insert of FIG. 2A.
Figure 5C:
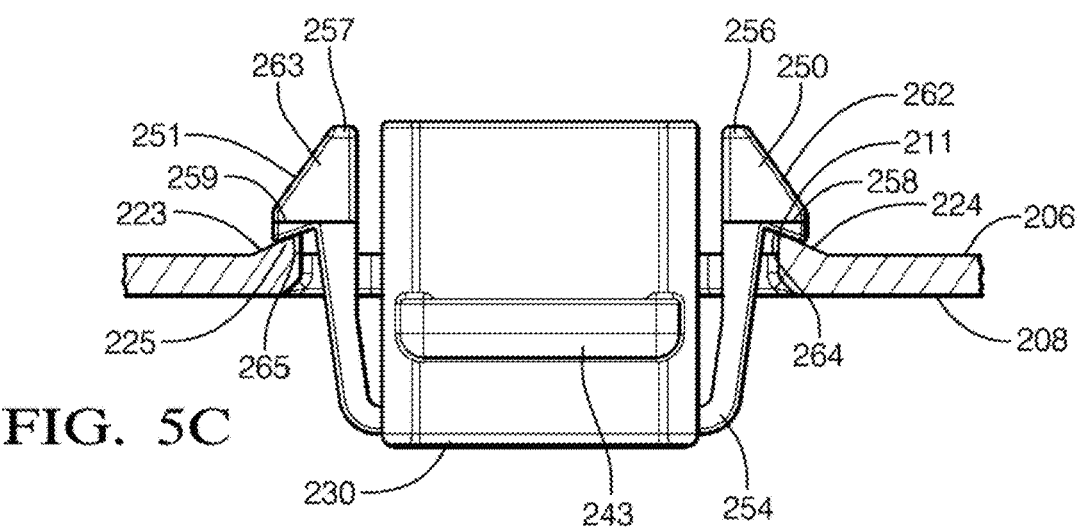
FIG. 5C is a third sequential left side view of the first mount and first insert of FIG. 2A.

The first mount 130 may include at least one fence 204 extending from the base 202 and surrounding at least a portion of the aperture 210. The fence 204 is configured for protecting the mount and/or insert connected thereto. In FIGS. 5A through 5C, the fence 204 is not illustrated, whereas the fence 204 is illustrated in FIG. 3.

FIGS. 5A through 5C illustrate an assembly sequence where the first insert 140 attaches to the wire tray 120. To mount the wire tray 120 to the substrate 10, the upper end 232 of the body 230 and the insertion ends of the cantilever lugs of the first insert 140 are inserted through the aperture 210 of the mount 130 and are pushed in through the bottom surface 208 of the mount 130 to releasably lock the first insert 140 onto the mount 130 of the wire tray 120. Once attached, the first insert 140 can then be positioned for engagement with the threads 30 of the stud 20, for example, by the pawls 240 engaging the threads 30 of the stud 20 to releasably attach the insert and mount of the wire tray assembly to the substrate 10.

To disengage the first insert 140 from the first mount 130 and unmount the wire tray 120 from the substrate 10, for example, to replace or fix a wire harness that is positioned in and/or attached to the channel 128, an operator may manipulate the snap-fit connection of the first insert 140 to de-actuate the connection. For example, by applying a force to the insertion faces to move the catches to disengage the connecting ledges, and then sliding the catches out of the aperture 210 of the first mount 130 to remove the first mount 130 from the first insert 140.

After removing the wire tray 120 from the stud 20, the first insert 140 can then be unscrewed from the stud 20 or can be left attached to the stud 20. If the first insert 140 is left attached to the stud 20, to reinstall the wire tray 120 back onto the first insert 140 (e.g., after replacing or fixing the wire harness), the operator can insert the catches back into the aperture 210 and into snap-fit engagement with the connecting ledges, increasing the efficiency of the process of detaching and reattaching a wire tray to the substrate, for example, when an operator is replacing or fixing a wire harness that is positioned in and/or attached to the channel of the wire tray.

The wire tray assembly 110 illustrated in FIG. 1 further includes a second mount 160 and a second insert 150, as further illustrated in FIGS. 6A-6C, 7A, 7B, and 8A-8C. The second insert 150 is configured for mounting the second mount 160 to a substrate 10 at a stud 22 that extends from the substrate 10. The second mount 160 may include a base 602 that extends from the wire tray 120 (e.g., from the second channel wall 126). The base 602 may be defined in a plane generally parallel to a plane of the base 122. The base 602 includes a top surface 606 opposite a bottom surface 608, with an aperture 610 defined therebetween. The second insert 150 is configured to connect to the second mount 160, for example, through a snap-fit connection. Through such a connection, the aperture 610 receives at least one insertion end (e.g., insertion end 656, insertion end 657) of a cantilever lug (e.g., cantilever lug 650, cantilever lug 651) of the second insert 150 therethrough. The aperture 610 may include a ramp 613 configured to guide the insertion end into the aperture 610.

Figure 6A:
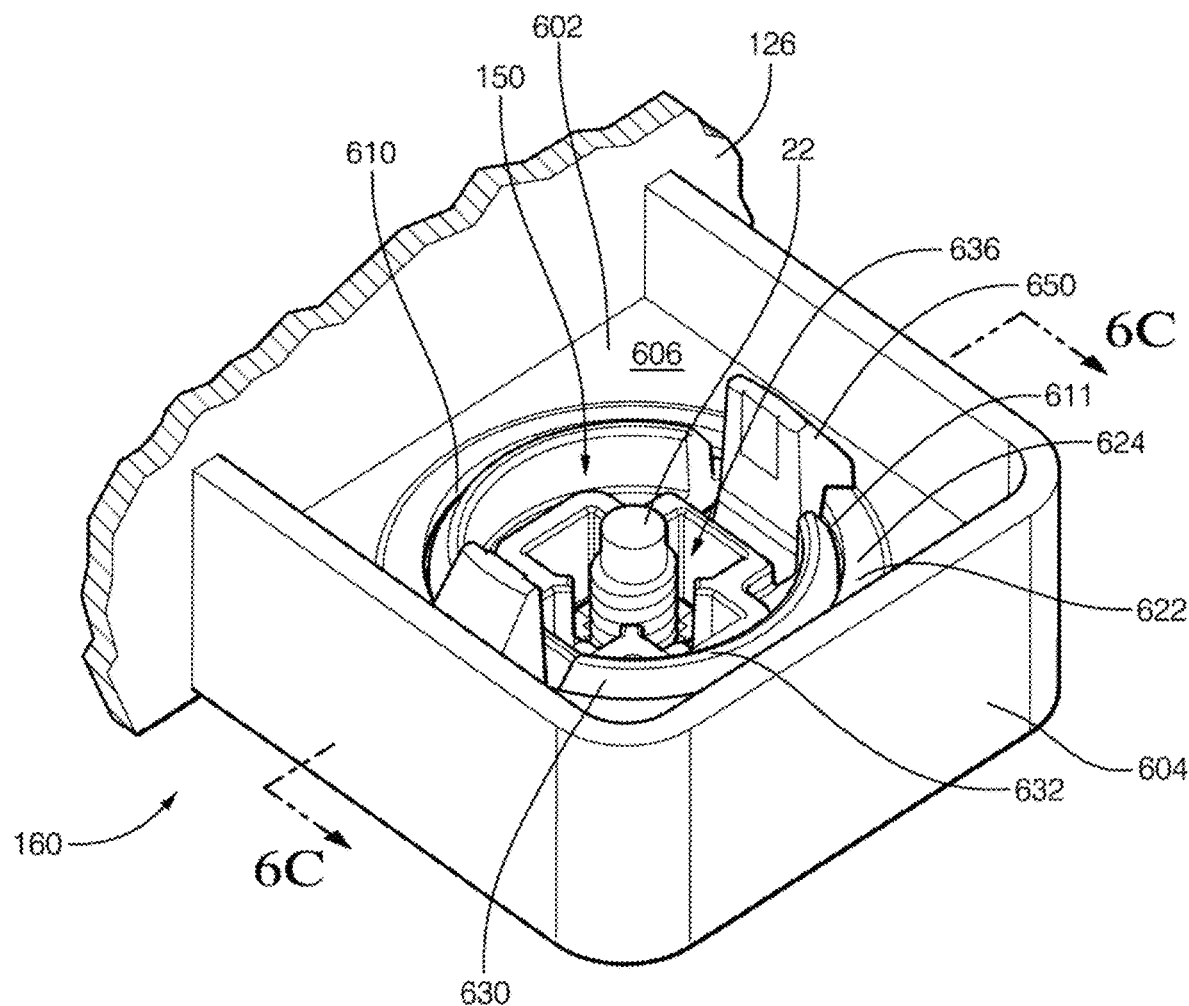
FIG. 6A is a partial, top perspective view of the wire tray assembly of FIG. 1, including a second mount and a second insert.

The aperture 610 is further illustrated in FIG. 6A and includes at least one sidewall 612. The sidewall 612 may extend between the top surface 606 and the bottom surface 608. The aperture 610 is further illustrated in FIG. 6A. The aperture 610 of the second mount 160 is illustrated in FIG. 6A as generally circular-shaped, having a sidewall 612 shaped to receive a cylindrical-shaped second insert 150 therein. In aspects, an aperture may have a cross-shape, a generally cylindrical shape, a generally rectilinear shape, or another shape.

The second insert 150 includes a body 630 having an upper end 632 configured for insertion into the aperture 610 of the second mount 160 and a lower end 634 opposite the upper end 632. The body 630 may be configured to accept a tool to rotate the second insert 150 about a longitudinal axis of the second stud 22. In the example illustrated in FIG. 6A, a flat-blade screwdriver, or similar tool, may be inserted into the cavity 636 to either tighten or loosen the second insert 150 on the stud 22.

Figure 6B:
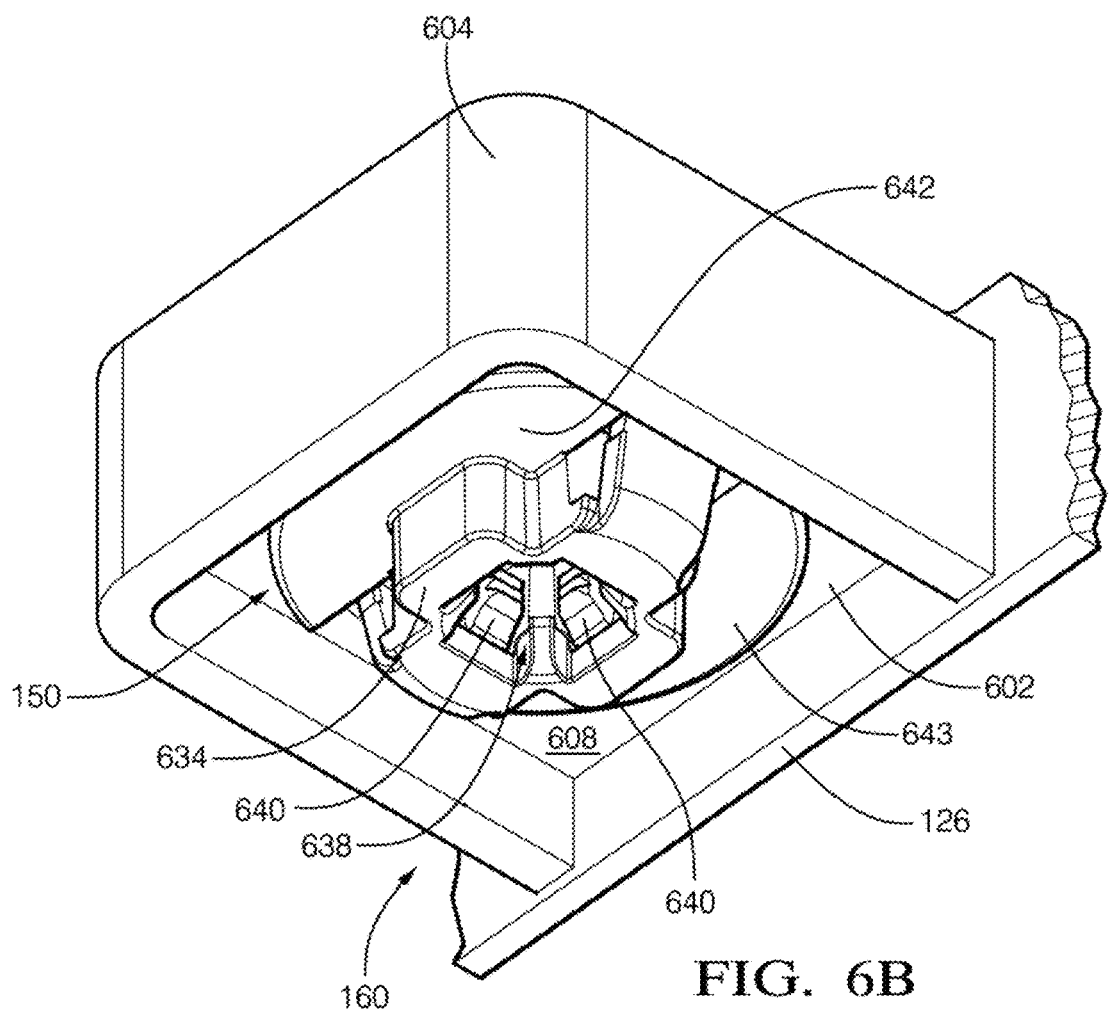
FIG. 6B is a partial, bottom perspective view of the second mount and second insert of FIG. 6A.
Figure 6C:
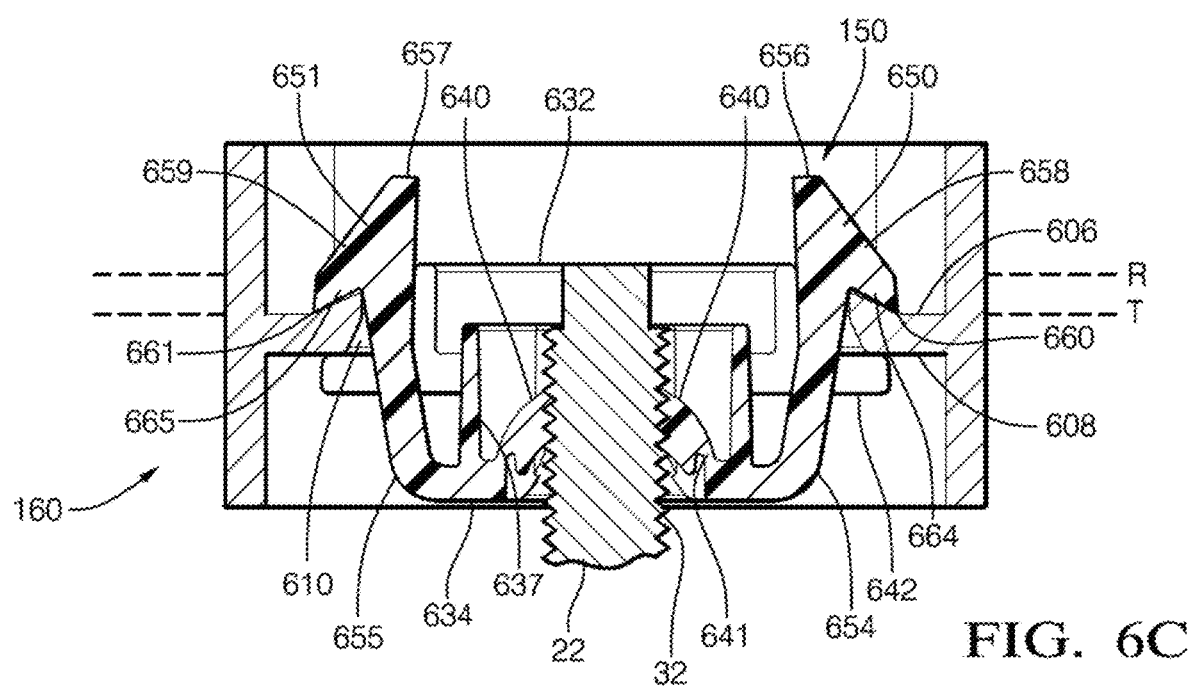
FIG. 6C a cross-sectional view of the second mount and second insert of FIG. 6A.
Figure 7A:
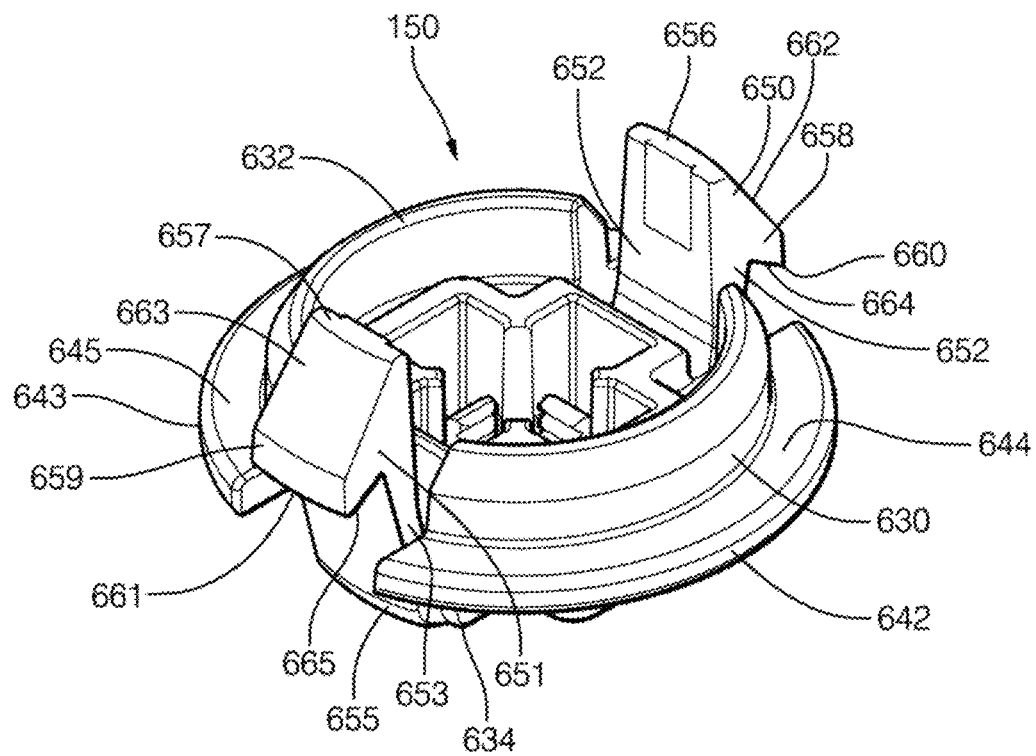
FIG. 7A is a top perspective view of the second insert of FIG. 6A.
Figure 7B:
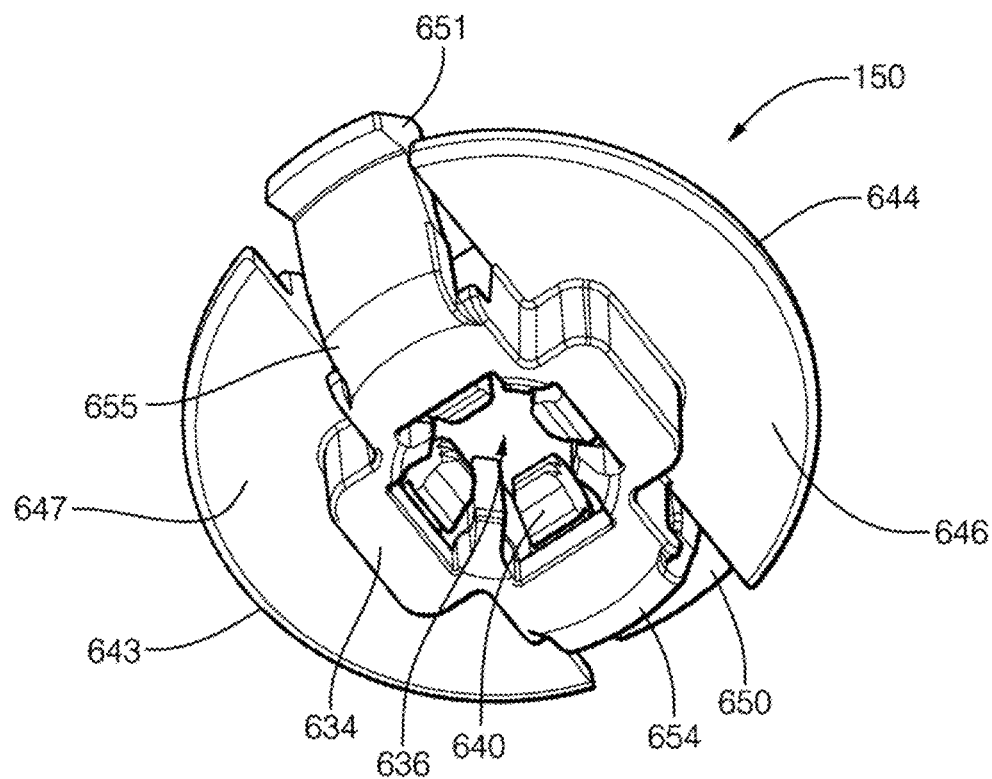
FIG. 7B is a bottom perspective view of the second insert of FIG. 6A.

In the aspect illustrated in FIGS. 6A-6C, a cavity 636 is defined in the body 630. The cavity 636 may extend into at least a portion of the body 630. The cavity 636 may include at least one thread-engaging receiver 638 (threaded receiver 638) configured to releasably engage the threads (e.g., threads 32) of a mounting stud (e.g., mounting stud 22) extending from the substrate 10.

The threaded receiver 638 may include one or more pawls 640 configured to releasably engage the threads of the mounting stud. The aspect illustrated in FIGS. 6A-7B includes four pawls. As illustrated in FIGS. 6C, the pawls 640 may attach to an inner surface 637 of the cavity 636 by webs 641 that define pivot points. The pivot points enable the pawls 640 to outwardly deflect when engaging the threads of the stud during installation. The webs 641 provide a spring-force such that the pawls 640 form a ratchet mechanism with the threads of the stud, thereby enabling the installation over the stud with the installation force. The threaded receiver 638 can be disengaged from the threads of the mounting stud to remove the insert from the stud. For example, the cavity 636 may be configured to receive a tool, such as a blade of a screwdriver, and the tool may be utilized by an operator to disengage one or more of the pawls 640 from the stud 22, thereby enabling the removal of the second insert 150 from the stud 22.

The insert (e.g., second insert 150) may be rotatable about a longitudinal axis of the mounting stud, enabling the insert to be threaded onto the stud. Likewise, the insert can be threaded off an engaged mounting stud. That is, the second insert 150 may be threaded on and off the stud 22 similar to a nut and bolt combination.

The second insert 150 may include at least one resilient cantilever lug (e.g., cantilever lug 650, cantilever lug 651) configured for flexible insertion through the aperture 610 and for snap-fit connection with a connecting ledge (e.g., connecting ledge 622) of the second mount 160, for example, a connecting ledge on a top surface 606 of the mount. The connecting ledge may be defined in and/or extend from the top surface of the mount. The aspect illustrated in FIGS. 6C, 7A, and 7B includes a first cantilever lug 650 configured for snap-fit connection with the connecting ledge 622 and a second cantilever lug 651 configured for snap-fit connection with the connecting ledge 622.

The second insert 150 is configured to be pushed into the aperture 610 through the bottom surface 608 of the wire tray 120 to removably attach the wire tray 120 to the substrate 10. Through use of the snap-fit connection, a catch of the cantilever lug can be disengaged from the connecting ledge, permitting the wire tray 120 to be removed from the substrate 10, while the second insert 150 remains attached to the stud 22.

The connecting ledge 622 may include a chamfer 624. The chamfer may be defined at any angle from horizontal. In aspects, the angle of the chamfer is 19 to 29 degrees from horizontal. In other aspects, the angle of the chamfer is 24 degrees from horizontal. The chamfer further includes an undercut face 626 configured to engage a retention face (e.g., retention face 664 of catch 658, retention face 665 of catch 659) when the snap-fit connection is actuated. The connecting ledge 622 may be an annular chamfer concentric with the aperture 610. The annular chamfer may extend from the rim 611 to the top surface 606. The chamfer may extend, at a first end, upwards away from the top surface 606 of the base 602, and, at a second end, extend from the aperture 610, as illustrated in FIG. 6C. In other aspects, the chamfer may be spaced apart from the aperture 610. The undercut face may be positioned at an arcuate angle to the aperture 610.

In the aspect illustrated in FIG. 6C, connecting ledge 622 includes a rim 611 and the chamfer 624 extends from the rim 611 to the top surface 606. The top surface 606 defines a top surface plane (T), and a rim plane (R) is defined between sides of the rim 611. The rim plane (R) may be generally parallel to the top surface plane (T) and vertically spaced from the top surface plane (T).

In the aspect illustrated in FIGS. 6A, 6C, 7A, 7B, and 8A-8C, the second insert 150 includes a first cantilever lug 650 and a second cantilever lug 651. A cantilever lug may include a beam (e.g., beam 652, beam 653) and a catch (e.g., catch 658, catch 659). The beam may include a root end (e.g., root end 654, root end 655) connecting to the body 630 and extending upwards therefrom to an insertion end (e.g., insertion end 256, insertion end 257). The root end may connect to the body 630 at the lower end 634 of the body 630. The insertion end may be configured for insertion through the aperture 610. The catch extends downwardly from the insertion end of the beam and is configured for engaging a connecting ledge of the base 602 to form the snap-fit connection.

The catch includes a tip (e.g., tip 660, tip 661) located between an insertion face (e.g., insertion face 662, insertion face 663) and a retention face (e.g., retention face 664, retention face 665). The insertion face is configured for contacting the sidewall and for inward deflection during actuation and de-actuation of the snap-fit connection. The retention face is configured to engage the connecting ledge on the top surface 606 of the base 602. In aspects, the retention face is at an arcuate angle to the insertion face. The retention face angle may be any angle from horizontal. In aspects, the retention face angle is 28 to 37 degrees from horizontal. In other aspects, the retention face angle is 32 degrees from horizontal.

The second insert 150 may further include at least one stop (e.g., stop 642, stop 643). The stop extends from the body 630 between the upper end 632 and the lower end 634. The stop is configured to limit the insertion of the body 630 through the aperture 610. The stop is positioned intermediate the catch and the lower end 634. The stop includes an upper side (e.g., upper side 644, upper side 645) configured for contacting and bearing against the bottom surface 608 of the second mount 160 and a lower side (e.g., lower side 646, lower side 647) spaced apart from the upper side. When inserted to the limit, the stop is positioned adjacently to the bottom surface 608 of second mount 160 and the catch of the cantilever lug is positioned adjacently a top surface 606 of the second mount 160, releasably holding the second insert 150 onto the second mount 160 between the stop and the catch. The contact between the upper side of the stop and the bottom surface transfers a retention-force from the stud 22 to the second mount 160 when the wire tray assembly 110 is installed on the substrate 10.

In the aspect illustrated in FIGS. 6A, 6B, 6C, 7A, and 7B, the body 630 has a generally circular shape between the upper end 632 and the stop, and the upper end 632 of the body 630 is configured for receipt into the circular aperture 610. In other aspects, the body may have a cross-shape, a generally cylindrical shape, a generally rectilinear shape, or another shape.

In aspects, such as illustrated in FIG. 6C, the top surface 606 of the second mount 160 includes the connecting ledge 622. The connecting ledge is configured for snap-fit connection with a cantilever lug of the second insert 150. In aspects, the connecting ledge is positioned above the plane of the top surface 606. When the snap-fit connection is actuated, the catch of the cantilever lug engages the connecting ledge 622, the stop (e.g., stop 642, stop 643) is brought into contact with the bottom surface 608 of the base 602 (as illustrated in FIG. 6B), and the wire tray 120 is connected to the second insert 150 at the second mount 160, as illustrated in FIG. 6C.

Figure 8A:
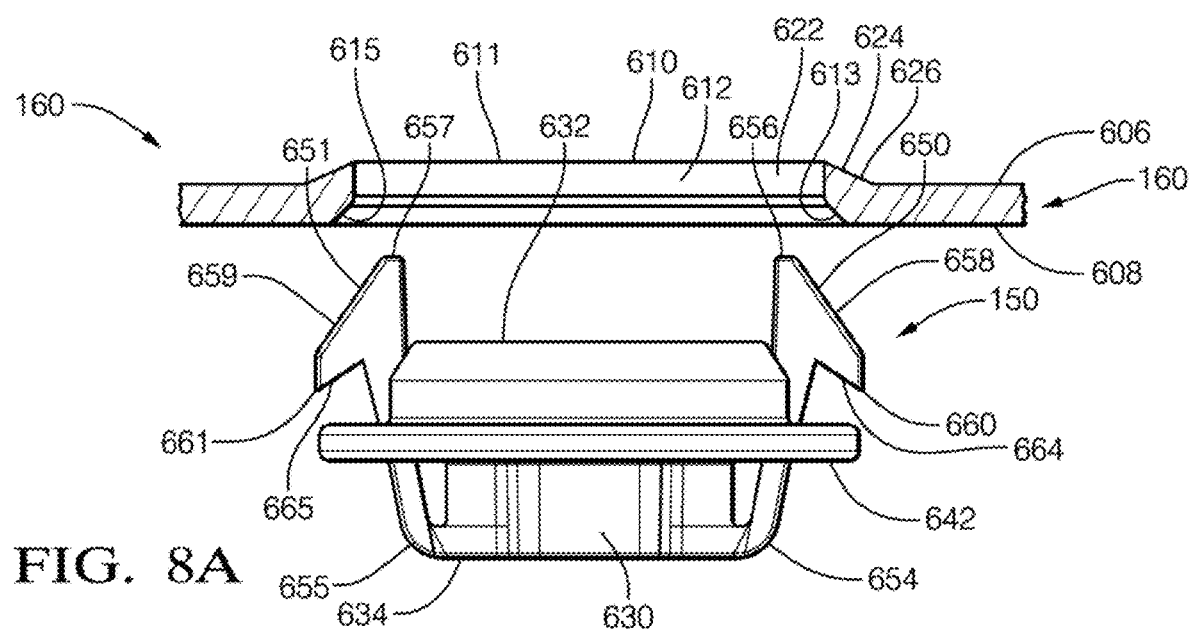
FIG. 8A is a first sequential left side view of the second mount and second insert of FIG. 6A.
Figure 8B:
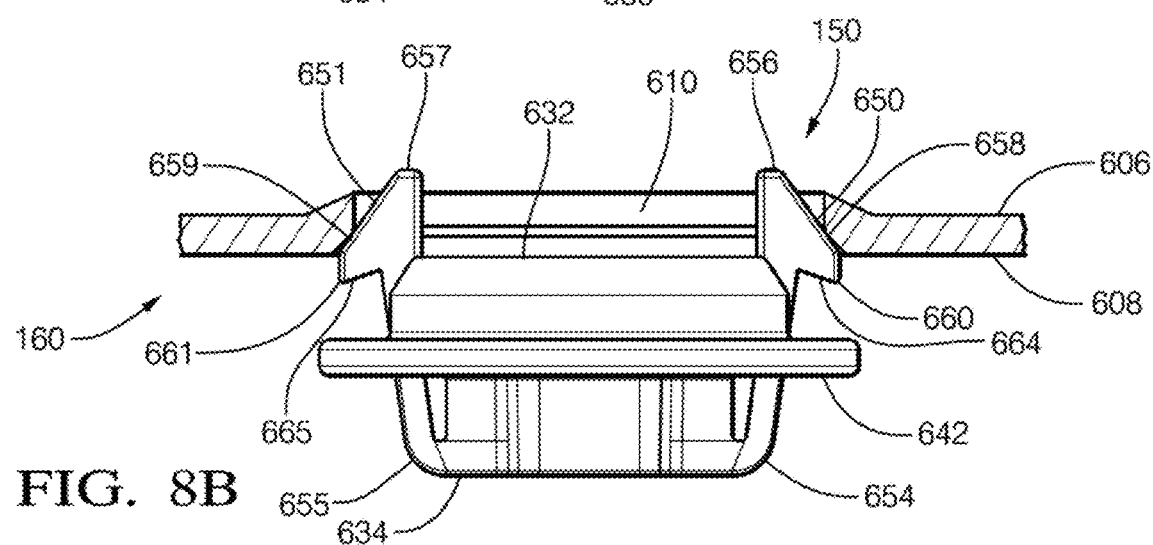
FIG. 8B is a second sequential left side view of the second mount and second insert of FIG. 6A.
Figure 8C:
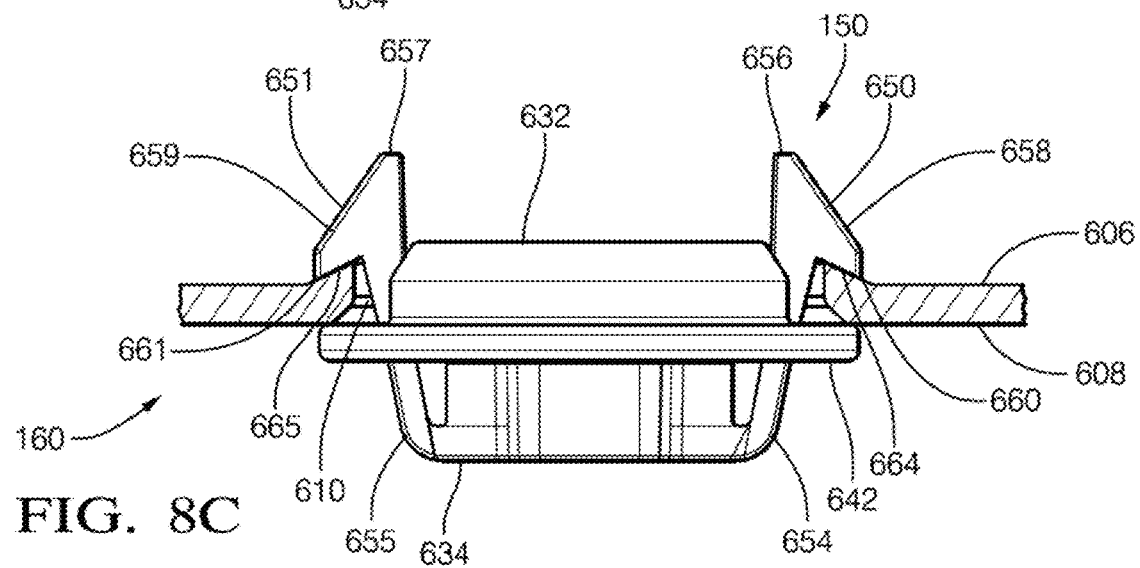
FIG. 8C is a third sequential left side view of the second mount and second insert of FIG. 6A.

The second mount 160 may include at least one fence 604 extending from the base 602 and surrounding at least a portion of the aperture 610. The fence 604 is configured for protecting the mount and/or insert connected thereto. In FIGS. 8A through 8C, the fence 604 is not illustrated, whereas the fence 604 is illustrated in FIG. 6A.

FIGS. 8A through 8C illustrate an assembly sequence where the second insert 150 attaches to the wire tray 120. To mount the wire tray 120 to the substrate 10, the upper end 632 of the body 630 and the insertion ends of the cantilever lugs of the second insert 150 are inserted through the aperture 610 of the second mount 160 and are pushed in through the bottom surface 608 of the second mount 160 to releasably lock the second insert 150 onto the second mount 160 of the wire tray 120. Once attached, the second insert 150 can then be positioned for engagement with the threads 32 of the stud 22, for example, by the pawls 640 engaging the threads 32 of the stud 22 to releasably attach the insert and the mount of the wire tray assembly to the substrate 10.

To disengage the second insert 150 from the second mount 160 and unmount the wire tray 120 from the substrate 10, for example, to replace or fix a wire harness that is positioned in and/or attached to the channel 128, an operator may manipulate the snap-fit connection of the second insert 150 to de-actuate the connection. For example, by applying a force to the insertion faces to move the catches to disengage the connecting ledges, and then sliding the catches out of the aperture 610 of the second mount 160 to remove the second mount 160 from the second insert 150.

After removing the wire tray 120 from the stud 22, the second insert 150 can then be unscrewed from the stud 22 or can be left attached to the stud 22. If the second insert 150 is left attached to the stud 22, to reinstall the wire tray 120 back onto the second insert 150 (e.g., after replacing or fixing the wire harness), the operator can insert the catches back into the aperture 610 and into snap-fit engagement with the connecting ledges.

FIG. 1 further illustrates a third insert 170 and a third mount 180. The third insert 170 and third mount 180 are similar to the first mount 130 and the first insert 140 illustrated in FIG. 1 and described above, except as detailed below. In FIG. 1, the third mount 180 is illustrated rotated 90-degrees with respect to the wire tray 120.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

ADDITIONAL EXAMPLES

Some additional examples of one or more of wire trays, mounting inserts, or assemblies thereof are as follows:

Example 1. A system, comprising a wire tray and a first insert. The wire tray comprising a mount. The mount comprising a top surface opposite a bottom surface, an aperture defined in the mount, and a connecting ledge extending from the top surface of the mount. The aperture extending from the top surface to the bottom surface. The aperture further comprising a sidewall. The first insert configured to be releasably retained by the mount. The first insert comprising a body and a cantilever lug. The body comprising an upper end configured for insertion into the aperture through the bottom surface, a lower end spaced apart from the upper end, and a cavity extending into the body. The cavity comprising a threaded receiver configured to releasably engage threads of a mounting stud. The cantilever lug configured for snap-fit connection with the connecting ledge. The cantilever lug comprising a beam, a catch, and a stop. The beam comprising a root end connecting to the body and extending upwards therefrom and an insertion end configured for insertion through the aperture. The catch extending downwardly from the insertion end of the beam. The catch configured to engage the connecting ledge. The stop configured for limiting the insertion of the body through the aperture. The stop extending from the body between the upper end and the lower end. The stop is positioned intermediate the catch and the lower end. The first insert is configured for insertion into the aperture through the bottom surface of the mount, with the stop bearing against the bottom surface of the mount. The first insert is configured for receiving the mounting stud therethrough, with the mounting stud extending through the aperture into the first insert, and with the threads of the mounting stud engaging the threaded receiver.

Example 2. The system of Example 1, wherein the insertion end extends past the upper end of the body.

Example 3. The system of Example 1, further comprising a top surface plane defined on the top surface and the aperture further comprising a rim defining a rim plane, the rim plane parallel to the top surface plane, the rim plane vertically spaced from the top surface plane.

Example 4. The system of Example 3, wherein the connecting ledge comprises a chamfer, the chamfer comprising an undercut face configured to engage a retention face of the catch.

Example 5. The system of Example 3, wherein the connecting ledge comprises an annular chamfer concentric with the aperture, the annular chamfer comprising an undercut face configured to engage a retention face of the catch.

Example 6. The system of Example 5, wherein the first insert further comprises a second cantilever lug configured for snap-fit connection with the connecting ledge. The second cantilever lug comprising a second beam. The second beam comprising a second root end connecting to the body and extending upwards therefrom, a second insertion end configured for insertion through the aperture, and a second catch. The second catch extending downwardly from the second insertion end of the second beam. The second catch configured to engage the connecting ledge.

Example 7. The system of Example 1, wherein the connecting ledge extends along the sidewall.

Example 8. The system of Example 1, wherein the aperture further comprises a first side opposite a second side, the sidewall located on the first side of the aperture, and a second sidewall. The second sidewall located on the second side of the aperture. The second sidewall spaced apart from and parallel to the sidewall. The connecting ledge extending along the sidewall. The mount further comprising a second connecting ledge extending from the top surface of the mount. The first insert further comprising a second cantilever lug configured for snap-fit connection with the second connecting ledge. The second cantilever lug comprising a second beam and a second catch. The second beam comprising a second root end and a second insertion end. The second root end connecting to the body and extending upwards therefrom. The second insertion end configured for insertion through the aperture. The second catch extending downwardly from the second insertion end of the second beam. The second catch configured to engage the second connecting ledge.

Example 9. The system of Example 8, wherein the connecting ledge comprises a chamfer The chamfer comprising an undercut face configured to engage a retention face of the catch. The second connecting ledge comprises a second chamfer. The second chamfer comprises a second undercut face configured to engage a second retention face of the second catch.

Example 10. The system of Example 1, wherein the threaded receiver further comprises a plurality of pawls configured to releasably engage threads of the mounting stud.

Example 11. The system of Example 1, further comprising a top surface plane defined on the top surface and the aperture further comprising. The rim defining a rim plane. The rim plane parallel to the top surface plane. The rim plane vertically spaced from the top surface plane. The connecting ledge further comprising an annular chamfer concentric with the aperture. The annular chamfer comprising an undercut face configured to engage a retention face of the catch. The insertion end extends past the upper end of the body.

Example 12. The system of Example 11, wherein the first insert further comprises a second cantilever lug configured for snap-fit connection with the connecting ledge. The second cantilever lug comprising a second beam and a second catch. The second beam comprising a second root end connecting to the body and extending upwards therefrom and a second insertion end configured for insertion through the aperture. The second catch extending downwardly from the second insertion end of the second beam. The second catch configured to engage the connecting ledge.

Example 13. The system of Example 1, further comprising a top surface plane defined on the top surface. The aperture further comprising a rim defining a rim plane. The rim plane parallel to the top surface plane. The rim plane vertically spaced from the top surface plane. The connecting ledge further comprising a chamfer The chamfer comprising an undercut face configured to engage a retention face of the catch. The aperture further comprising a first side opposite a second side, the sidewall located on the first side of the aperture, and a second sidewall, the second sidewall located on the second side of the aperture, the second sidewall spaced apart from and parallel to the sidewall. The connecting ledge extending along the sidewall. The mount further comprising a second connecting ledge extending from the top surface of the mount. The first insert further comprising a second cantilever lug configured for snap-fit connection with the second connecting ledge. The second cantilever lug comprising a second beam and a second catch. The second beam comprising a second root end and a second insertion end. The second root end connecting to the body and extending upwards therefrom. The second insertion end configured for insertion through the aperture. The second catch extending downwardly from the second insertion end of the second beam. The second catch configured to engage the second connecting ledge.

Example 14. The system of Example 13, wherein the connecting ledge comprises a chamfer The chamfer comprising an undercut face configured to engage a retention face of the catch. The second connecting ledge comprises a second chamfer The second chamfer comprising a second undercut face configured to engage a second retention face of the second catch.

Example 15. An apparatus comprising a body, a cantilever lug, and a stop. The body comprising an upper end, a lower end opposite the upper end, and a cavity extending into the body. The cavity comprising a threaded receiver configured to releasably engage threads of a mounting stud. The cantilever lug configured for snap-fit connection with a connecting ledge of a mount. The cantilever lug comprising a beam and a catch. The beam comprising a root end connecting to the body and extending upwards therefrom, and an insertion end configured for insertion through an aperture of the mount. The insertion end extends past the upper end of the body. The catch extending downwardly from the insertion end of the beam. The catch configured for engaging the connecting ledge. The stop configured for limiting the insertion of the body through the aperture. The stop extending from the body between the upper end and the lower end. The stop positioned intermediate the catch and the lower end. The apparatus is configured for insertion into the aperture through a bottom surface defined in the mount with an upper side of the stop bearing against the bottom surface of the mount. The apparatus is further configured for receiving the mounting stud therethrough, the mounting stud extending through the aperture into the apparatus, the threads of the mounting stud engaging the threaded receiver.

Example 16. The apparatus of Example 15, wherein the apparatus further comprises a second cantilever lug configured for snap-fit connection with the connecting ledge, a second beam, and a second catch. The second root end connecting to the body and extending upwards therefrom. The second insertion end configured for insertion through the aperture. The second insertion end extends past the upper end of the body. The second catch extending downwardly from the second insertion end of the second beam. The second catch configured to engage the connecting ledge.

Example 17. The apparatus of Example 15, wherein the body has a generally cylindrical shape between the upper end and the stop, and wherein the upper end of the body is configured for receipt into a circular aperture of the mount.

Example 18. The apparatus of Example 15, wherein the apparatus further comprises a second cantilever lug, a second beam, and a second catch. The second cantilever lug configured for snap-fit connection with a second connecting ledge of the mount. The second beam comprising a second root end connecting to the body and extending upwards therefrom, and a second insertion end configured for insertion through the aperture. The second insertion end extends past the upper end of the body. The second catch extending downwardly from the second insertion end of the second beam. The second catch configured to engage the second connecting ledge.

Example 19. The apparatus of Example 15, wherein the body has a generally rectilinear shape between the upper end and the stop, and wherein the upper end of the body is configured for receipt into a cross-shaped aperture of the mount.

Example 20. The apparatus of Example 15, wherein the threaded receiver comprises a plurality of pawls configured to releasably engage threads of the mounting stud.

Conclusion

Although implementations of techniques and apparatuses for releasably attaching an object to a substrate have been described in language specific to features and/or methods, it is to be understood that the subject of the appended claims is not necessarily limited to the specific features or methods described. Rather, the specific features and methods are disclosed as example implementations of techniques and apparatuses for releasably attaching an object to a substrate.

What is claimed is:

1. A system, comprising:
   a mount configured for mounting to a substrate, the mount comprising:
      a first surface opposite a second surface;
      an aperture defined in the mount, the aperture extending from the first surface to the second surface, the aperture further comprising a sidewall; and
      a connecting ledge defined in the mount;
   an insert configured to be releasably retained by the mount, the insert comprising:
      a body, the body comprising:
         an upper end configured for insertion into the aperture through the second surface; and
         a lower end spaced apart from the upper end;
      a cantilever lug configured for snap-fit connection with the connecting ledge, the cantilever lug comprising:
         a beam, the beam comprising:
            a root end connecting to the body and extending upwards therefrom; and
            an insertion end configured for insertion through the aperture;

a catch, the catch extending downwardly from the insertion end of the beam, the catch configured to engage the connecting ledge; and a stop, the stop configured for limiting the insertion of the body through the aperture, the stop extending from the body between the upper end and the lower end, the stop is positioned intermediate the catch and the lower end, wherein the insert is configured for insertion into the aperture through the second surface of the mount, with the stop bearing against the second surface of the mount.

2. The system of claim 1, wherein the body further comprises:
a cavity extending into the body.

3. The system of claim 2, wherein the cavity further comprises:
a threaded receiver configured to releasably engage threads of a mounting stud.

4. The system of claim 3, wherein the insert is configured for receiving a portion of the mounting stud therein, with the mounting stud extending through the aperture into the insert and with the threads of the mounting stud engaging the threaded receiver.

5. The system of claim 3, wherein the threaded receiver further comprises:
a plurality of pawls configured to releasably engage threads of the mounting stud.

6. The system of claim 1, wherein the connecting ledge defined in the mount comprises:
a connecting ledge extending from the first surface of the mount.

7. The system of claim 1, further comprising:
a first surface plane defined on the first surface; and
the aperture further comprising:
a rim defining a rim plane, the rim plane parallel to the first surface plane, the rim plane vertically spaced from the first surface plane, and
wherein the connecting ledge comprises:
a chamfer, the chamfer comprising an undercut face configured to engage a retention face of the catch.

8. The system of claim 7, wherein the connecting ledge comprises:
an annular chamfer concentric with the aperture, the annular chamfer comprising an undercut face configured to engage a retention face of the catch.

9. The system of claim 8, wherein the insert further comprises:
a second cantilever lug configured for snap-fit connection with the connecting ledge, the second cantilever lug comprising:
a second beam comprising:
a second root end connecting to the body and extending upwards therefrom; and
a second insertion end configured for insertion through the aperture; and
a second catch, the second catch extending downwardly from the second insertion end of the second beam, the second catch configured to engage the connecting ledge.

10. The system of claim 1,
wherein the aperture further comprises:
a first side opposite a second side, the sidewall located on the first side of the aperture; and
a second sidewall, the second sidewall located on the second side of the aperture, the second sidewall spaced apart from and parallel to the sidewall;
wherein the connecting ledge extends along the sidewall;
wherein the mount further comprises:
a second connecting ledge extending from the first surface of the mount;
wherein the insert further comprises:
a second cantilever lug configured for snap-fit connection with the second connecting ledge, the second cantilever lug comprising:
a second beam, the second beam comprising:
a second root end, the second root end connecting to the body and extending upwards therefrom; and
a second insertion end, the second insertion end configured for insertion through the aperture; and
a second catch, the second catch extending downwardly from the second insertion end of the second beam, the second catch configured to engage the second connecting ledge.

11. The system of claim 10,
wherein the connecting ledge comprises:
a chamfer, the chamfer comprising an undercut face configured to engage a retention face of the catch; and
wherein the second connecting ledge comprises:
a second chamfer, the second chamfer comprising a second undercut face configured to engage a second retention face of the second catch.

12. An apparatus comprising:
a body, the body comprising:
an upper end; and
a lower end opposite the upper end; and
a cantilever lug configured for snap-fit connection with a connecting ledge of a mount, the cantilever lug comprising:
a beam, the beam comprising:
a root end connecting to the body and extending upwards therefrom; and
an insertion end configured for insertion through an aperture of the mount, wherein the insertion end extends past the upper end of the body;
a catch, the catch extending downwardly from the insertion end of the beam, the catch configured for engaging the connecting ledge; and
a stop, the stop configured for limiting the insertion of the body through the aperture, the stop extending from the body between the upper end and the lower end, the stop positioned intermediate the catch and the lower end,
wherein the apparatus is configured for insertion into the aperture through a second surface defined in the mount with an upper side of the stop bearing against the second surface of the mount.

13. The apparatus of claim 12, wherein the body further comprises:
a cavity extending into the body.

14. The apparatus of claim 13, wherein the cavity further comprises:
a threaded receiver configured to releasably engage threads of a mounting stud.

15. The apparatus of claim 14, wherein the apparatus is further configured for receiving a portion of the mounting stud therein, with the mounting stud extending through the aperture into the apparatus, and with the threads of the mounting stud engaging the threaded receiver.

16. The apparatus of claim 14, wherein the threaded receiver comprises:

a plurality of pawls configured to releasably engage threads of the mounting stud.

17. The apparatus of claim 12, wherein the apparatus further comprises:
   a second cantilever lug configured for snap-fit connection with the connecting ledge, the second cantilever lug comprising:
   a second beam comprising:
      a second root end connecting to the body and extending upwards therefrom; and
      a second insertion end configured for insertion through the aperture, wherein the second insertion end extends past the upper end of the body; and
   a second catch, the second catch extending downwardly from the second insertion end of the second beam, the second catch configured to engage the connecting ledge.

18. The apparatus of claim 12, wherein the body has a generally cylindrical shape between the upper end and the stop, and wherein the upper end of the body is configured for receipt into a circular aperture of the mount.

19. The apparatus of claim 12, wherein the apparatus further comprises:
   a second cantilever lug configured for snap-fit connection with a second connecting ledge of the mount, the second cantilever lug comprising:
   a second beam comprising:
      a second root end connecting to the body and extending upwards therefrom; and
      a second insertion end configured for insertion through the aperture, wherein the second insertion end extends past the upper end of the body; and
   a second catch, the second catch extending downwardly from the second insertion end of the second beam, the second catch configured to engage the second connecting ledge.

20. The apparatus of claim 12, wherein the body has a generally rectilinear shape between the upper end and the stop, and wherein the upper end of the body is configured for receipt into a cross-shaped aperture of the mount.

* * * * *